(12) United States Patent
Pozo Torres et al.

(10) Patent No.: US 12,166,387 B2
(45) Date of Patent: Dec. 10, 2024

(54) ASSEMBLY METHODS FOR ARMATURE ASSEMBLIES AND GENERATORS

(71) Applicant: General Electric Renovables Espana, S.L., Barcelona (ES)

(72) Inventors: Pablo Pozo Torres, Barcelona (ES); Vincent Teychenne De Blazi, Montoir-de-bretagne (FR); Mikhail Avanesov, Garching (DE); Álvaro Francés Pérez, Barcelona (ES); Julio Cesar Urresty, Barcelona (ES); Regis Peron, Nantes (FR)

(73) Assignee: General Electric Renovables Espana, S.L., Barcelona (ES)

( * ) Notice: Subject to any disclaimer, the term of this patent is extended or adjusted under 35 U.S.C. 154(b) by 107 days.

(21) Appl. No.: 17/739,643

(22) Filed: May 9, 2022

(65) Prior Publication Data

US 2022/0360154 A1 Nov. 10, 2022

(30) Foreign Application Priority Data

May 10, 2021 (EP) .................................... 21382425

(51) Int. Cl.
*H02K 15/16* (2006.01)
*H02K 7/18* (2006.01)
*F03D 9/25* (2016.01)

(52) U.S. Cl.
CPC ......... *H02K 15/165* (2013.01); *H02K 7/1838* (2013.01); *F03D 9/25* (2016.05); *F05B 2220/706* (2013.01); *F05B 2230/60* (2013.01)

(58) Field of Classification Search
CPC ............................ H02K 15/165; H02K 7/1838
See application file for complete search history.

(56) References Cited

U.S. PATENT DOCUMENTS 5,506,453 A * 4/1996 McCombs ................ F03D 9/25
290/55
8,468,681 B2 6/2013 Helle et al.
(Continued)

FOREIGN PATENT DOCUMENTS

CA 1140975 A * 2/1983 ............. H02K 11/33
JP S5944952 A 3/1984
(Continued)

OTHER PUBLICATIONS

Extended European Search Report Corresponding to EP21382425 on Oct. 26, 2021.
(Continued)

*Primary Examiner* — Aneeta Yodichkas
*Assistant Examiner* — Jose K Abraham
(74) *Attorney, Agent, or Firm* — Dority & Manning, P.A.

(57) ABSTRACT

A method for assembling a generator rotor carrying permanent magnets defining a magnetic field and a generator stator defining an armature having a plurality of coils includes moving one or both of the generator rotor and the generator stator towards the other of the generator stator and the generator rotor to generate relative movement between the generator rotor and the generator stator. Simultaneously with the relative movement, the coils of the armature are electrically feed such that circulating currents along the armature create a magnetic field in an opposite direction of the magnetic field created by the permanent magnets to reduce a magnetic attraction between the generator rotor and the generator stator.

6 Claims, 5 Drawing Sheets

(56) References Cited

U.S. PATENT DOCUMENTS

| | | | |
|---|---|---|---|
| 9,627,949 B2 | 4/2017 | Booth et al. | |
| 9,764,434 B2* | 9/2017 | Jensen | H02K 15/16 |
| 2004/0113507 A1* | 6/2004 | Yoda | H02K 21/22 |
| | | | 310/179 |
| 2007/0194637 A1* | 8/2007 | Childe | H02K 15/165 |
| | | | 310/68 B |
| 2009/0174277 A1* | 7/2009 | Mueller | H02K 35/02 |
| | | | 310/156.64 |
| 2012/0228965 A1* | 9/2012 | Bang | H02K 21/12 |
| | | | 310/156.02 |
| 2013/0169392 A1* | 7/2013 | Mongeau | H02K 15/03 |
| | | | 335/284 |
| 2014/0084590 A1* | 3/2014 | Rhinefrank | H02K 1/28 |
| | | | 310/91 |
| 2019/0383359 A1* | 12/2019 | Tesar | H02K 7/1838 |
| 2020/0403536 A1* | 12/2020 | Kim | H02K 3/28 |
| 2021/0021177 A1* | 1/2021 | Abel, Sr. | H02K 7/1815 |
| 2023/0034019 A1* | 2/2023 | Luo | F03D 9/25 |

FOREIGN PATENT DOCUMENTS

| | | |
|---|---|---|
| JP | S61128747 A | 6/1986 |
| JP | H04190660 A | 7/1992 |
| RU | 2223588 C2 | 2/2004 |
| WO | WO-2015024590 A1 * | 2/2015 ............. B65D 85/64 |

OTHER PUBLICATIONS

McElveen et al., A New More Reliable Solution for Cooling Tower Drives, 2009 Record of Conference Papers—Industry Applications Society 56th Annual Petroleum and Chemical Industry Conference, XP031551908, NJ, 2009, pp. 1-8. https://www.semanticscholar.org/paper/A-new-more-reliable-solution-for-cooling-tower-McElveen-Lyles/45c4c575139438f81598b669c795109f4ab3887b.

\* cited by examiner

ASSEMBLY METHODS FOR ARMATURE ASSEMBLIES AND GENERATORS

The present disclosure relates to armature assemblies for electrical machines and methods for operating them. More in particular, the present disclosure relates to armature assemblies for assembling a permanent magnet generator for a wind turbine and to methods for operating the armature assemblies.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through a gearbox. This way, the generator produces electricity which can be supplied to the electrical grid.

The wind turbine hub may be rotatably coupled to a front of a nacelle. The wind turbine hub may be connected to a rotor shaft, and the rotor shaft may then be rotatably mounted in the nacelle using one or more rotor shaft bearings arranged inside the nacelle. The nacelle is a housing arranged on top of a wind turbine tower that typically contains and protects e.g. the gearbox (if present) and the generator and, depending on the wind turbine, further components such as a power converter, and auxiliary systems.

The generator may have a field and an armature, the field being configured to generate a magnetic field and the armature being configured to support a voltage induced in its windings due to the time-varying magnetic field created by the relative motion of the armature and the field. The armature may be stationary in operation and the field may be rotatable, e.g. by a shaft, in an example. The shaft may be a rotor shaft of a wind turbine rotor.

A field may include permanent magnets. Permanent magnet generators may be deemed more reliable and require less maintenance than other types of generators. They may be particularly suitable for offshore wind turbines. Permanent magnets may be provided in permanent magnet modules, which may be attached to the field as a single item. Permanent magnet modules may be arranged on an outer or inner circumference of a rim of the field.

A permanent magnet module may be defined as a unit having a plurality of permanent magnets such that the plurality of magnets can be mounted and unmounted together. Such a module may have a module base with a shape suitable for housing or receiving a plurality of permanent magnets. The magnets may be fixed to the base in a diversity of manners. The base may be configured to be fixed to a field rim, e.g. to a rotor rim, in such a way that the plurality of magnets are fixed together to the field rim through the module base. The use of permanent magnet modules may facilitate the manufacturing of a generator field.

Irrespective of whether the permanent magnets are grouped in modules or not, the magnets are normally arranged so as to cause magnetic flux that follows a path that crosses an air gap between a field, e.g. the permanent magnets of the rotor, and an armature, e.g. coils of the stator, in such a manner that the armature is reached and influenced by the magnetic flux.

It is known to assemble large electrical machines, like direct drive wind turbine generators, by bringing the rotor inside the stator, or bringing the stator inside the rotor. The magnets may be magnetized and attached to the field once the field and the armature have already been put together. As these steps would be carried out in the main line of production of the generator, this may be a relatively slow and time-consuming process.

Attaching the permanent magnets to the field before the approach of the field and the armature may enable a faster assembly process. For example, a rotor with already magnetized magnets may be placed over a stator with coils. However, the presence of the already magnetized magnets may cause that the field magnetically attracts the armature rather strongly. Magnetic field of more than 1 T (tesla) may develop between the armature and the field. Magnetic forces between the armature and the field may be of 400, 600 or more kN (kilo newtons). The probability of deforming and damaging the stator and/or rotor may therefore increase with this option. The presence of the already magnetized magnets in the field may complicate putting the armature and the field together in an effective, easy, fast and safe way.

Even though in the present disclosure focus is on wind turbine generators, and particularly permanent magnet generators of direct drive wind turbines (which are much larger and heavier than generators used in wind turbines with a gearbox), similar problems and challenges may arise in the assembly of other electrical machines.

SUMMARY

In an aspect of the present disclosure, an armature is provided. The armature assembly comprises an armature including a plurality of coils. The armature assembly further comprises a power source and a control system configured to selectively feed the plurality of coils when one of a field comprising one or more permanent magnets and the armature approaches the other of the field and the armature during an assembly of a permanent magnet electrical machine. The electrical machine may be a permanent magnet generator for a wind turbine, and in particular a direct-drive wind turbine.

According to this aspect, currents may be injected to the armature for creating a magnetic field which opposes (in direction) the magnetic field created by the permanent magnets. Accordingly, a resultant overall magnetic field may be decreased and attraction forces between a field comprising magnetized permanent magnets and the armature may be reduced and compensated. Deformation and damage of the rotor and/or the stator may therefore be avoided during the assembly process.

As the magnets may be joined to the field outside the main line of production of the generator, the assembly process of the generator may be faster. Inspecting and controlling the quality during the field preassemblies operations may also be easier if performed before joining it to the armature.

In a further aspect, a method for assembling a generator rotor carrying permanent magnets and a generator stator is provided. The method comprises moving at least one of the generator rotor and the generator stator towards the other of the generator rotor and the generator stator. The method further comprises simultaneously electrically feeding an armature of the generator stator.

In yet a further aspect, another method for assembling a permanent magnet generator comprising an armature and a field for a wind turbine is provided. The method comprises axially and vertically descending the field towards the armature. The method further comprises injecting currents into the armature while the field is descended.

DETAILED DESCRIPTION OF EXAMPLES

Figure 1:
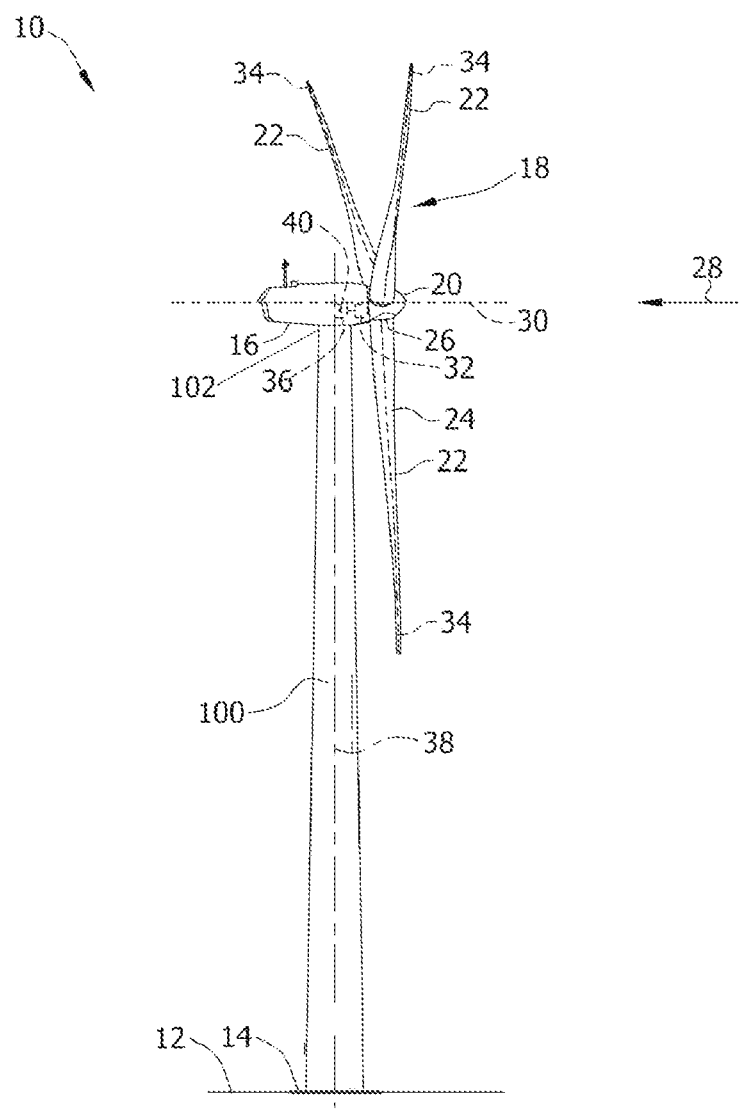
FIG. 1 schematically illustrates a perspective view of one example of a wind turbine.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Even though examples are particularly shown for armatures for generators of wind turbines, the same or similar armature assemblies and methods may be used in other applications as well.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 100 that extends from a support system 14 on a ground 12, a nacelle 16 mounted on tower 100, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 100 may be fabricated from tubular steel to define a cavity (not shown in FIG. 1) between a support system 14 and the nacelle 16. In an alternative embodiment, the tower 100 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
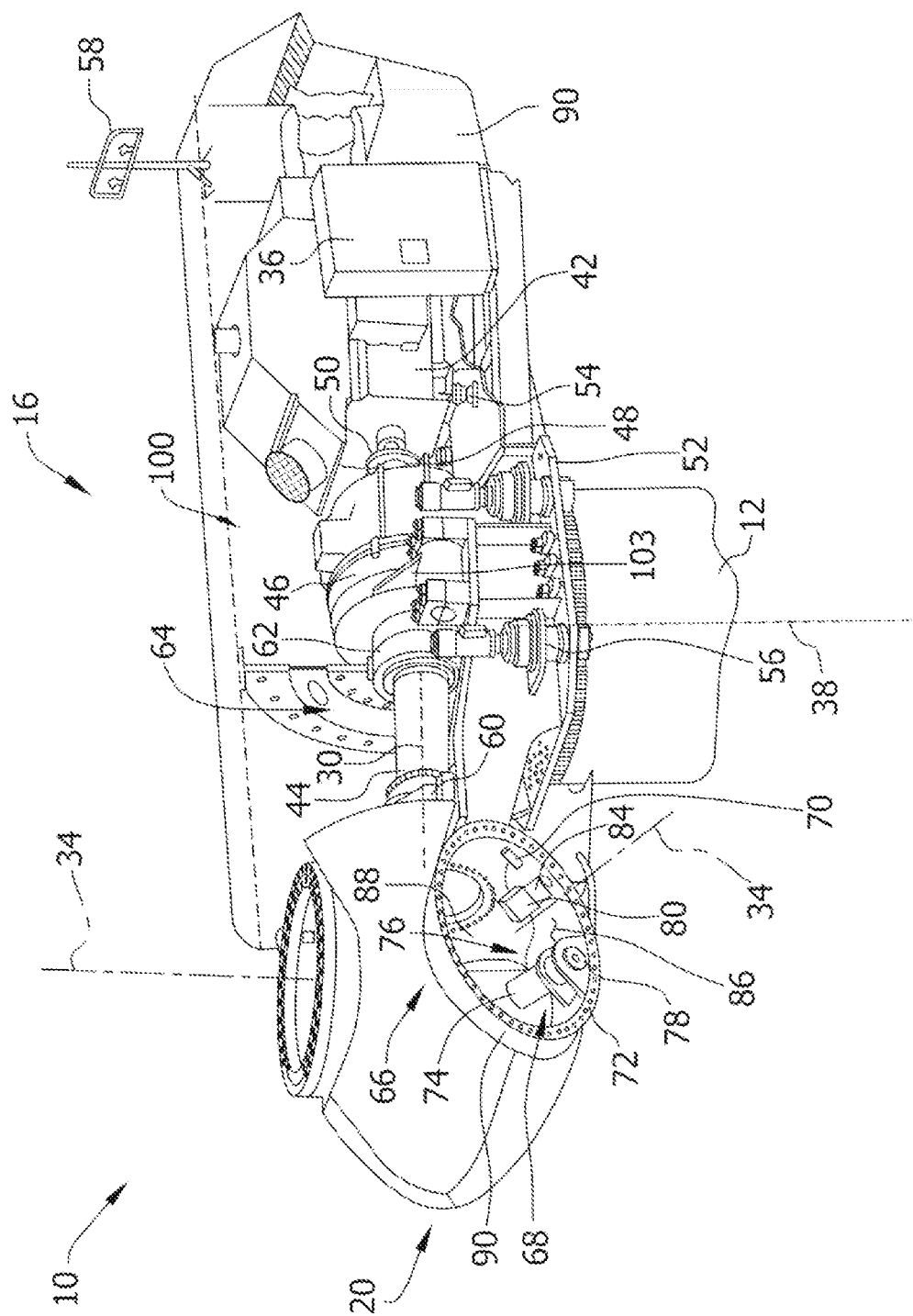
FIG. 2 illustrates a simplified, internal cross-sectional view of one example of the nacelle of the wind turbine of FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 100.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 100 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct-drive wind turbine without gearbox 46. Generator 42 operate at the same rotational speed as the rotor 18 in direct-drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

One aspect of the present disclosure provides an armature assembly 300. The armature assembly 300 comprises an armature 310 including a plurality of coils 315. The armature assembly 300 further comprises a power source 330 and a control system 335 configured to selectively (electrically) feed the plurality of coils 315 when one of a field 320 comprising one or more permanent magnets 325 and the armature 310 approaches the other of the field 320 and the armature 310 during an assembly of a permanent magnet electrical machine. The permanent magnet electrical machine may be a permanent magnet generator for a wind turbine 10, and more in particular for a direct-drive wind turbine.

Figure 3:
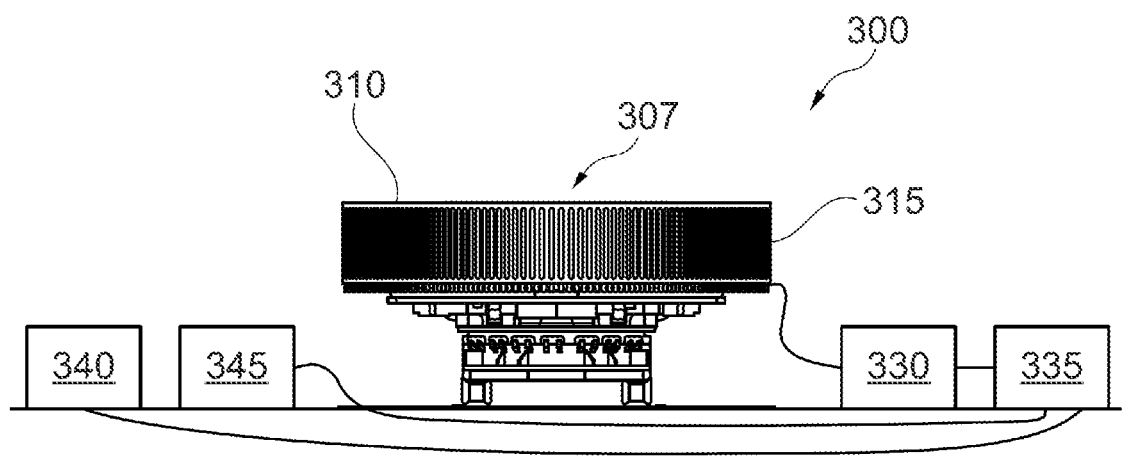
FIG. 3 schematically illustrates a side view of an example of an armature assembly.
Figure 4:
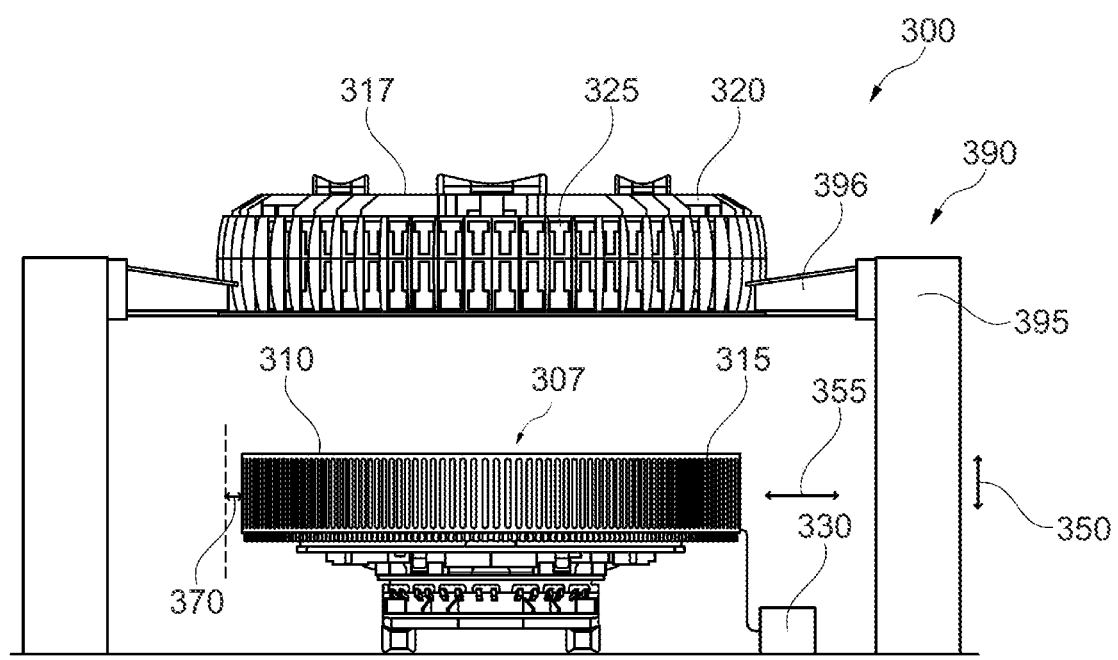
FIG. 4 schematically illustrates a side view of an example of a generator rotor comprising a field and a generator stator comprising an armature being approached.

FIGS. 3 and 4 show examples of an armature assembly 300 in which the armature 310 is comprised in a generator stator 307. In other examples, the armature 310 may be comprised in a generator rotor 317.

The coils 315 of the armature 310 may be grouped in windings. A winding may be understood as an electrical conductor, e.g. a wire, included in the armature. A winding may be wound forming turns, e.g. around an armature tooth. A group of turns may be referred to as a coil. Thus, a winding may comprise one or more coils. For instance, a winding may comprise fifteen coils and each coil may be wound around an armature tooth.

The armature 310 may comprise more than one winding. For example, armature 310 may comprise three, six, nine or more windings. Each winding may be configured to provide an electrical phase, usually different from the other electrical phases.

FIG. 4 shows how a field 320 and an armature 310 (i.e. how the rotor 317 comprising the field 320 and the stator 307 comprising the armature 310) may be approached. In FIG. 4 the field 320 is included in a rotor 317, but in other examples the field 320 may be in a stator 307.

Although the assembled rotor 317 and stator 307 of FIG. 4 would form a radial field electric machine, the present disclosure may be also applicable to axial field or transverse field electrical machines.

As illustrated in FIG. 4, the field 320 may be descended, e.g. in a vertical and axial direction 350, such that the field 320 radially surrounds the armature 310. In some other examples, the field 320 may be configured to be placed radially inside the armature 310. In some examples, the armature 310 may be the one to be descended towards the field 320.

Still in some other examples, the field 320 and the armature 310 may be configured to be disposed side-by-side or approached in any suitable direction. In general, one or both of the field 320 and the armature 310 may be moved towards the other.

When a field 320 comprising one or more permanent magnets 325 and an armature 310 are assembled, magnetic attraction forces may develop between the field 320 and the armature 310. For example, magnetic attraction forces may arise in a radial direction 355 when the permanent magnets 325 in the field 320 and the coils 315 in the armature 310 start to face one another or to be aligned in the radial direction 355.

In some examples, the air gap 370 between the field 320 and the armature 310, e.g. in a radial direction 355, may be less than 10 mm (millimeters), for example between 5 and 7 mm. Accordingly, quite strong magnetic fields may develop between these structures, these magnetic fields reaching and overcoming 1 T. The field 320 and/or the armature 310 may therefore deform and even run into each other, getting damaged and ruining the assembly of the generator 42.

Circulating currents along the armature 310 while the field 320 and the armature 310 are being approached may create a magnetic field in an opposite direction of the magnetic field created by the permanent magnets. An overall resulting magnetic field and therefore also magnetic attraction forces between these structures may be reduced, enabling a more effective and safer assembly of the generator 42.

A power source 330 may be configured to feed the coils 315 of the armature 310. A power source may include any kind of suitable electrical battery. In some examples, a converter may be used to supply power to the coils 315.

A power source 330 may be connected to the coils 315. Connection may require for example two wires or cables, one for guiding current towards the coils and another one for guiding current out of the coils and closing the electrical circuit.

A power source 330 may supply power to one or more windings of the armature 310. In some examples, current may be circulated through all the windings of the armature 310 simultaneously. In some other examples, current may be circulated through some but not all the windings of the armature 310 simultaneously. Current may be circulated at least in part simultaneously through two or more windings in any example.

More than one power source may be used for electrically feeding the windings. For example, a number of power sources equal to the number of windings of the armature 310 may be provided. In this example, each winding would have a dedicated power source 330.

Using one or more switches for changing which windings are fed may also be possible.

Any of DC current and AC current may be supplied to the armature 310. In case of DC current, the amplitude and the direction of circulation of the supplied currents may be adapted for creating a magnetic field in an opposite direction of the magnetic field created by the permanent magnets and counteracting the attraction between the armature 310 and the field 320.

In some examples, the armature 310 may be divided into two or more sectors 365. A sector 365, see FIG. 5, may be understood as a portion of the armature 310 comprising a plurality of coils 315. The coils may be contiguous. A sector 365 may be independently fed by a power source 330 from other sectors. Control of the distance, e.g. an air gap 370, between the armature 310 and the field 320 may be enhanced in this way. In some examples, a sector 365 may include only one coil. It may be possible to electrically feed all or only some windings of a sector.

The control system 335 is configured to control the current to be injected to the plurality of coils 315 during the approach of the armature 315 and the field 320. The control system 335 may include a controller, and the controller may comprise a memory and a processor. The memory may comprise instructions to be read and executed by the processor. The memory may also include data, for example data measured by one or more sensors with respect to the field 320 and/or the armature 310. The processor may read and execute the instructions stored in the memory. The controller may be a main controller.

The control system 335, e.g. the controller, may be communicatively coupled with the power source 330. If there are additional power sources, the control system 335 may be communicatively coupled with some or all the additional power sources. The control system 335 may indicate one or more power sources the voltage to be applied to or the current to be supplied to a winding.

The control system 335 may indicate the amplitude and/or direction of circulation of the current. The control system 335 may indicate which windings are fed and how long they are fed. A same winding may be fed more than once while the field 320 and the armature 310 are assembled.

The control system may have additional controllers for adapting the current circulation through the windings during the approach of the field 320 and the armature 310. For example, a local controller may be provided for each winding. A local controller may also control more than one winding. In an example, the armature 310 may have six windings, a first local controller may be configured to control three of the windings, and a second controller may be configured to control the three remaining windings. Similarly, a local controller may be provided for controlling a specific sector 365 of the armature 310.

The armature assembly 300 may further comprise one or more sensors 340. The control system 335 may be configured to control the currents injected in the armature 310 based on the measurements provided by the one or more sensors.

One or more sensors 340 may be configured to determine a distance between the armature 310 and the field 320 at one or more locations. The distance may be an air gap 370. The distance may be a horizontal or radial distance. In examples, a plurality of sensors 340 may be arranged around a circumference of rotor and/or stator to determine whether the air gap is constant along the circumference. If a deviation is measured, current may be injected to compensate for such a deviation. A vertical or axial distance between the armature 310 and the field 320 may additionally or alternatively be determined.

Any suitable sensor which enables to detect how close the armature 310 and the field 320 are to one another, in particular how close the magnetized permanent magnets and the coils are, may be used. The distance may be determined in a direction in which the magnetic flux would flow from the permanent magnets to the coils 315 once the armature 310 and field 320 are assembled. In FIG. 4 this direction would be the radial or horizontal direction 355.

Determination may be direct or indirect. A direct determination may include measuring a distance between the armature and the field. An indirect determination may include measuring a first distance between a reference and the field 320, and a second distance between the reference and the armature 310. A distance between the field 320 and the armature 310 may be then obtained from the first and second distances. The reference may be the sensor. An indirect determination may include measuring any suitable physical quantity (e.g. force) and from that value(s) determining, either by the sensor 340 or by a control system 335, a distance, e.g. airgap 370, between the field and the armature.

A sensor may be connected or attached to the armature 310, to the field 320 or to a specific support. The specific support may be supporting or connected to the armature 310, the field 320 or none of them.

The sensor(s) 340 may be communicatively connected with the control system 335. When the sensor measures one or more values, it may send them to the control system 335. The control system 335 may instruct the power source 330 to modify the power supplied to the coils 315 of the armature 310. Modifying may include varying the magnitude of the voltage or current applied to one or more windings. Modifying may also include changing the direction of the current circulating through one or more windings. Magnitude and/or direction of currents may be modified.

Depending on the values determined by one or more sensors 340, the control system 335 may indicate the power source 330 to keep the power being fed to one or more windings, instead of changing it.

If there are more than one sensor for measuring a distance, e.g. an air gap 370, between the armature 310 and the field 320, the above explanation applies to the other distance sensors as well.

Figure 5:
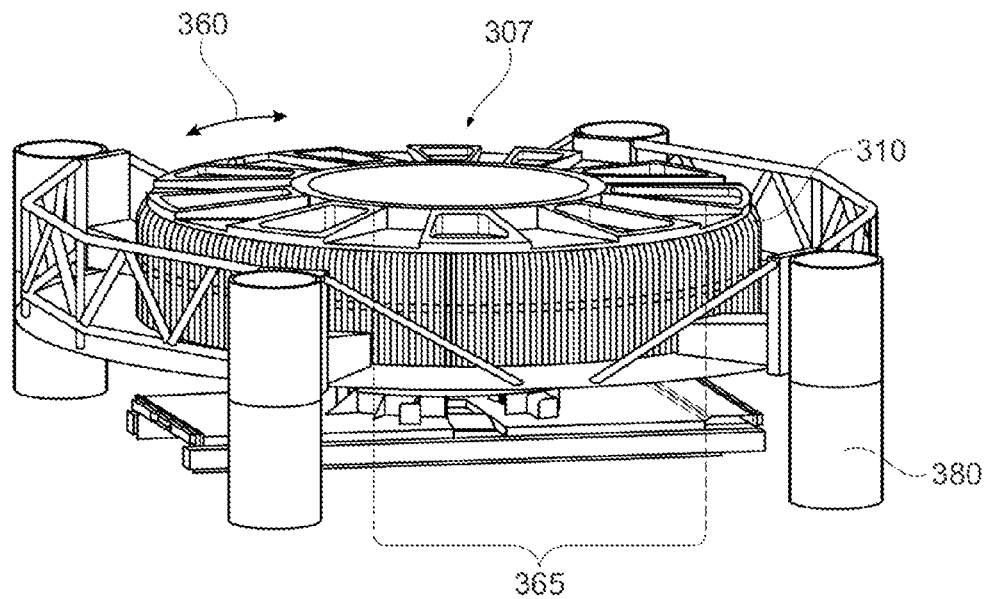
FIG. 5 schematically illustrates a perspective view of an example of a generator stator comprising an armature supported by a frame.
Figure 6:
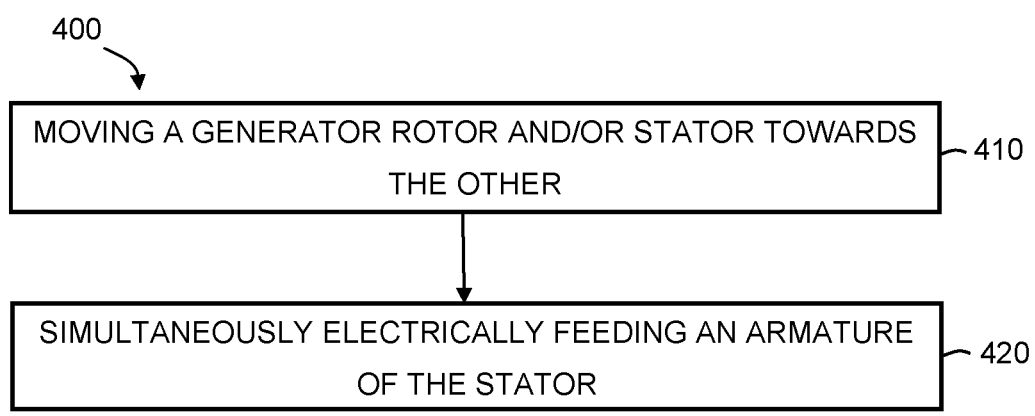
FIG. 6 schematically illustrates an example of a method for assembling a permanent magnet generator for a wind turbine.
Figure 7:
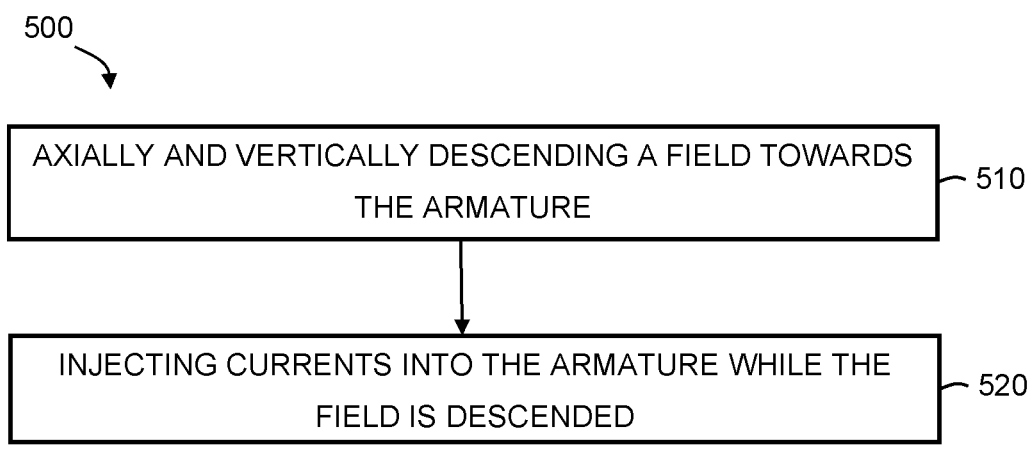
FIG. 7 schematically illustrates another example of a method for assembling a permanent magnet generator for a wind turbine.

If the generator 42 is a radial machine, as e.g. in FIGS. 3-5, a plurality of distance sensors may be placed in a tangential direction 360. They may be evenly spaced. For example, six distance sensors may be placed around the armature 310 (or field 320), wherein the space between two contiguous sensors in any position along a tangential direction 360 may be 60°.

The armature assembly 300 may comprise one or more sensors 345 configured to determine torque exerted on one of the field and the armature. When the armature 310 and the field 320 approach, magnetic forces between them may cause the armature 310 and/or the field 320 to rotate with respect to the other. For example, in FIG. 4, the field 320 and/or the armature 310 may start to rotate in a tangential 360 direction. Such rotation (and possibly some deformation in other directions) may be stopped or reduced at least in part by a structure or frame 380, e.g. an armature frame, holding the pieces. However, this may not be enough for avoiding deformation due to magnetic attraction forces and enabling a precise and effective assembly of field 320 and armature 310.

A sensor 345 for determining torque or rotation of one of the armature 310 and field 320 with respect to the other may provide a direct or indirect determination. An indirect determination may comprise measuring one or more suitable physical quantities and from there extracting a torque value. In some examples, angular speed may be measured. One or more values measured or determined by a sensor 345 may be forwarded to a control system, e.g. to a controller. Such a controller may be a main controller, or may be a different controller.

A torque sensor 345 may comprise a load cell or a linear or angular encoder. Other torque sensors are possible. A torque sensor may be attached or connected to the field 320 or the armature 310. For example, a torque sensor may be attached or connected to the structure (armature 310 or field 320) configured to be moved towards the other structure (field 320 or armature 310). More than one torque sensor may be used.

A controller, e.g. a main controller, may adapt the power fed to one or more windings depending on the torque values received or determined from one or more torque sensors. If a support or frame is supporting or holding the field 320 or the armature 310, the support may be moved, e.g. rotated, to compensate the torque.

The armature assembly 300 may further comprise an armature frame or mechanical stiffener 380 configured to hold the armature 310. An example of such a frame 380 is shown in FIG. 5. In this example, the frame 380 is configured to avoid, or at least reduce, the deformation undergone by the armature 310 when the field 320 is approached to it. The armature frame 380 may be configured to move the armature 310 towards the field 320.

Similarly, the armature assembly 300 may further comprise a field frame 390 configured to hold the field 320. The field frame may be configured to move the field 320 towards the armature 310. The field frame 390 may for example comprise two or more arms 395, and an arm 395 may comprise one or more clamps 396. A clamp 396 may hold the field 320 for descending it towards the armature 310, as in FIG. 4. Arms 395 may enable to rotate the field 320 in a tangential direction 360. Such rotation may compensate for torque detected by one or more torque sensors 345.

A field frame 390 may comprise any component which allows to mechanically move the field 320 as required to control a tangential movement of the field 320. For example, a field frame 390 may be moved according to previous measurements of one or more sensors, e.g. load cells, to avoid or reduce rotation of the field 320, e.g. a rotor, in a circumferential direction. Any suitable sensor able to measure displacement of the field 320 in a circumferential direction may be used.

The armature assembly 300 may further comprise a field 320 including a plurality of permanent magnets. The magnets may be arranged in magnet modules. The permanent magnets are magnetized before approaching the armature and the field.

In FIGS. 3-5, the generator is a wind turbine generator for a direct drive wind turbine. The armature is comprised in the stator, but in other examples the armature may be in the rotor. In FIG. 4, the field is comprised in the rotor, but in other examples the field may be in the stator.

In a further aspect of the disclosure, a method 400 for assembling a generator rotor 317 carrying permanent magnets and a generator stator 307 is provided. Any armature assembly 300 as described above with regard to FIGS. 3-5 may be used.

The method comprises, at block 410, moving at least one of the generator rotor 317 and the generator stator 307 towards the other of the generator rotor 317 and the generator stator 307. For example, at least one of the generator rotor and the generator stator may be moved along a rotation axis of the generator rotor such that one of the generator rotor and the generator stator radially surrounds the other of the generator rotor and the generator stator. The armature 310 and the field 320 may be approached in an axial and vertical direction 350, as in FIG. 4. At least one of the generator rotor 317 and the generator stator 307 may be moved vertically. In some other examples, they may be approached in an axial and horizontal direction. In general, they may be approached in any suitable direction.

Approaching should be herein understood as bringing the armature 310 and the field 320 closer to each other for assembling the generator 42. Approaching may comprise moving one of the armature 310 and the field 320 towards the other. For example, the field 320 may be moved towards the armature 310, as in FIG. 4. Approaching may also comprise moving both the armature 310 and the field 320 towards the other.

The armature 310 and/or the field 320 may be held by a frame 380, 390 during the approach. For example, a mechanical stiffener 380 may hold the armature 310 as in FIG. 5 for reducing deformation of the armature 310 when the field 320 is brought closer to it.

A frame 390 may move the at least one of the generator rotor 317 and the generator stator 307. A field frame 390, e.g. comprising a plurality of arms 395 with clamps 396, may be used to hold and move the field 320. For example, a plurality of arms 395 with clamps 396 may move, e.g. descend, the field 320 towards the armature 310 as in FIG. 4. In other examples, such a frame may move the armature 310.

The method further comprises, at block 420, simultaneously electrically feeding an armature 310 of the generator stator 307. One or more power sources 330 may perform this task. Current may not necessarily be fed from the beginning of the displacement of the rotor and/or stator. Current may start to be fed after a certain distance or position between the field 320 and the armature 310 is reached, or after a certain value of a certain magnitude has been attained.

Current injected into the armature may be AC current or DC current. If DC current is used, positive and negative DC currents may be fed to the armature 310. For example, one or more windings may be fed with positive DC current and one or more different windings may be fed with negative DC current. The amplitude and direction of the current circulating through the windings may be selected for creating a magnetic field that opposes the magnetic field created by the permanent magnets, and compensating the magnetic attraction forces between the armature 310 and the field 320 .

A distance, e.g. a radial distance, between the generator rotor 317 and the generator stator 307 at one or more locations may be determined. The armature 310 may be electrically fed at least partially based on the determined distance. A distance may be determined between the armature 310 and the field 320.

For example, an air gap 370 may be determined when the permanent magnets 325 start to face the coils 315 in a radial direction 355. A distance sensor may directly or indirectly determine such distance 370. A control system 335 may receive information from one or more sensors 340, e.g. one or more distance sensors, and indicate one or more power sources 330 to modify or keep the power being fed to the armature 310. Magnetic forces created by the currents circulated through the windings of the armature 310 may counteract the magnetic attraction forces between the armature 310 and the field 320 in a controlled way.

The armature 310 may be divided into two or more sectors 365 or portions. A portion 365 of the armature 310 may be electrically fed independently from another portion 365 of the armature 310. The control of the magnetic forces between the armature 310 and the field 320, and thus the control of the assembly process, may be improved in this way.

The method may further comprise determining a torque exerted on at least one of the generator rotor 317 and the generator stator 307, and electrically feeding the armature 310 at least partially based on the determined torque. In other words, rotation between the field 320 and the armature 310 may be measured. One or more torque sensors 345 may directly or indirectly determine torque and one or more controllers of a control system 335 may take this information into account when instructing one or more power sources 330 to feed the armature 310.

A control system 330 may additionally or alternatively indicate an actuator to mechanically oppose to the torque detected. For example, arms 370 holding the field 320 may rotate the field 320 to decrease the torque being experienced and better control the approach of the field 320 and the armature 310.

Still a further aspect of the disclosure provides another method 500 for assembling a permanent magnet generator comprising an armature 310 and a field 310 for a wind turbine 10. Similarly to the method 400 above, any armature assembly 300 as described with respect to FIGS. 3-5 may be used.

The method comprises, at block 510, axially and vertically descending the field 320 towards the armature 310. If the field 320 is included in a rotor 317, the rotor 317 may be descended. The armature 310 may be held in place by a mechanical stiffener 380, as e.g. in FIG. 5. If the armature is comprised in a stator 307, the stator is the one held in place.

The method further comprises, at block 520, injecting currents into the armature 310 while the field 320 is descended. Injected currents may be DC currents. One or more power sources 330 may inject the currents into the armature 310.

The method may further comprise determining a horizontal distance between the armature 310 and the field 320. A horizontal distance may be an airgap 370. One or more distance sensors 340 may directly or indirectly sense the horizontal distance.

The method may further comprise determining torque of the field 320. One or more torque sensors 345 may be used to sense torque.

The explanation provided with respect to FIGS. 3 to 5 may be applied to this method 500. Similarly, one or more aspects of method 400 may be applied to method 500.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for assembling a generator rotor carrying permanent magnets defining a permanent magnetic field and a generator stator defining an armature having a plurality of coils, the method comprising:
   from a disassembled state of the generator rotor and the generator stator, moving one or both of the generator rotor and the generator stator axially towards the other of the generator stator and the generator rotor to generate relative axial movement between the generator rotor and the generator stator such that the generator rotor is moved axially into the generator stator or the generator stator is moved axially into the generator rotor;
   simultaneously electrically feeding the coils of the armature from a power source such that circulating currents along the armature while the approaching generator rotor and the generator stator creates a magnetic field in an opposite direction of the magnetic field created by the permanent magnets to reduce a magnetic attraction between the generator rotor and the generator stator;
   with one or more sensors, measuring an air gap distance between the generator rotor and the generator stator; and
   controlling the electrical feeding of the coils based on the air gap distance measured by the one or more sensors.

2. The method of claim 1, wherein positive and negative DC currents are fed to the armature to create the circulating currents along the armature.

3. The method of claim 1, wherein a frame is used to move the generator rotor or the generator stator relative to the other of the generator stator or the generator rotor.

4. The method of claim 1, wherein individual portions of the armature coils are electrically fed independently from each other.

5. The method of claim 1, further comprising:
   determining a torque exerted on one of the generator rotor or the generator stator; and
   electrically feeding the armature at least partially based on the determined torque.

6. The method of claim 1, wherein the relative axial movement between the generator rotor and the generator stator is in a vertical direction.

* * * * *